United States Patent [19]

Weber et al.

[11] Patent Number: 4,959,779

[45] Date of Patent: Sep. 25, 1990

[54] DUAL BYTE ORDER COMPUTER ARCHITECTURE A FUNCTIONAL UNIT FOR HANDLING DATA SETS WITH DIFFERNT BYTE ORDERS

[75] Inventors: Larry B. Weber, Palo Alto; Craig C. Hansen, Mountain View; Thomas J. Riordan, Atherton; Steven A. Przybylski, Menlo Park, all of Calif.

[73] Assignee: Mips Computer Systems, Inc., Mountain View, Calif.

[21] Appl. No.: 277,406

[22] Filed: Nov. 28, 1988

Related U.S. Application Data

[63] Continuation of Ser. No. 827,282, Feb. 6, 1986, abandoned.

[51] Int. Cl.⁵ .................................................. G06F 7/00
[52] U.S. Cl. ........................................ 364/200; 341/78
[58] Field of Search ............... 364/200, 900; 341/78, 341/88, 102, 103

[56] References Cited

U.S. PATENT DOCUMENTS

| | | | |
|---|---|---|---|
| 3,573,744 | 4/1971 | Rigazio | 364/200 |
| 3,699,525 | 10/1972 | Klavins | 364/200 |
| 3,846,763 | 11/1974 | Riikonen | 364/200 |
| 3,996,566 | 12/1976 | Moran | 364/200 |
| 4,203,102 | 5/1980 | Hydes | 340/723 |
| 4,281,315 | 7/1981 | Bauer et al. | 364/200 |
| 4,494,186 | 1/1985 | Goss et al. | 364/200 |
| 4,512,018 | 4/1985 | Phelps et al. | 370/112 |
| 4,559,614 | 12/1985 | Peek et al. | 340/790 X |
| 4,595,911 | 6/1986 | Kregness et al. | 364/200 |
| 4,595,980 | 6/1986 | Innes | 364/200 |

OTHER PUBLICATIONS

Cohen, "On Holy Wars and a Plea for Peace", Computer, 10/81, pp. 48-54.

Primary Examiner—David L. Clark
Attorney, Agent, or Firm—Kenyon & Kenyon

[57] ABSTRACT

A CPU or other function unit is disclosed which follows one data ordering scheme internally, and in which incoming and/or outgoing data pass through a data order conversion unit for adapting it to a selectable external data ordering scheme. The means for specifying the external data ordering scheme is accessible from outside the physical package(s) in which the functional unit is housed. The data order conversion unit may comprise a load aligner and/or a store aligner, one or both of which may comprise means for shifting informational units of a smaller size within informational units of a larger size. The shift amount may derive from the low order address bits and may be altered depending on the external data ordering means selected.

4 Claims, 2 Drawing Sheets

DUAL BYTE ORDER COMPUTER ARCHITECTURE A FUNCTIONAL UNIT FOR HANDLING DATA SETS WITH DIFFERNT BYTE ORDERS

This is a continuation of co-pending application Ser. No. 827,282, filed on Feb. 6, 1986, now abandoned.

BACKGROUND OF THE INVENTION

1. Field of the Invention

The invention relates to computer architectures, and more particularly to means for accommodating various ordering schemes for the storage of information.

2. Description of Related Art

Data is organized in modern computers in either of two formats or in some combination of those formats. The formats are known as "big endian", in which the high order bit, byte or other unit of information is located in the lower numbered unit address, and "little endian," in which the high order unit of information is located in the higher numbered unit address. See Cohen, "On Holy Wars and a Plea for Peace," *Computer*, 10/81, pp. 48–54, which contains a good discussion of the data organization problem. Thus, in a true big endian computer architecture, bits of data are thought of as being lined up from left to right, the lowest numbered and most significant bit being on the right. When this string of bits is divided into, for example, 8-bit bytes, 16-bit halfwords and/or 32-bit words, the lowest numbered and most significant byte, halfword or word continues to be located on the left. In a true little endian architecture, the scheme is exactly the opposite. Bits, bytes, halfwords and words are numbered right to left, the least significant bit, byte, halfword or word being located on the right. Within a given computer, or within a given functional unit (such as a CPU) within a computer, it makes no difference which scheme is chosen because all the hardware and software can be designed around the chosen scheme. The difference becomes important when one computer or functional unit communicates with another, the data ordering scheme of which is not known. This is because information which is transmitted from the lowest numbered unit to the highest numbered unit will be most significant to least significant under the big endian scheme, but least significant to most significant under the little endian scheme.

In many modern computers, the smallest addressable unit of information (i.e., the smallest group of bits which one computer or functional unit may receive from, transmit to or refer to in another) is a byte. This eases the data ordering conflict because all the bits in the byte may be transmitted in parallel. Whereas the bits in the byte may be numbered differently for different data ordering schemes, the least significant bit is always on the right. The different data ordering schemes for such computers are therefore functionally identical for informational units smaller than a byte. However, it is still necessary to be concerned about byte, halfword and word ordering.

Also, it should be noted that some computers implement a mixed data ordering scheme. In these computers, words and larger units, for example, may have a big endian ordering, whereas halfwords, bytes and bits may have a little endian ordering. This adds complexity because on multiword transmissions of data it becomes necessary to know both that the first word is the high order word, and also that the first byte of that word is the low order byte.

The data ordering problem is particularly important to manufacturers of chip- and board-level microcomputer based products which are specific to a chosen data ordering scheme, such as CPU's. The conflict is not as important for other products, such as memory, because such products are usable without modification with any ordering scheme.

Manufacturers of chip- and board-level products typically intend their products to be incorporated into a computer with other chip- or board-level products of other manufacturers which may use a different data ordering scheme. Manufacturers therefore have, in the past, designed their products according to one data ordering scheme and marketed them only to customers with a compatible architecture. This effectively halves the manufacturer's available market. As an alternative, some manufacturers make and sell two versions of every product which needs a predefined data ordering scheme, one for each type of architecture. This solution is also unsatisfactory, however, because it requires the manufacturer to design, manufacture and maintain inventory on twice as many products. It also prevents the manufacturer from taking full advantage of the economies of scale, because only half the production volume of each version can be expected.

It is also possible to design products according to one ordering scheme, and rely on software to realign the informational units if the external hardware uses a different scheme. The software could move around informational units of whatever size is necessary. This avoids the necessity of designing, manufacturing and stocking different versions of each product, but it merely moves the difficulty to the software. Different versions of each compiler, operating system or other program must be written and supported, or a single version must be written which is capable of adapting itself for use with more than one ordering scheme. The latter solution can be extremely complicated to implement and can, under certain circumstances, result in intolerable overhead for software-managed data realignment.

SUMMARY OF THE INVENTION

It is therefore an object of the present invention to provide a functional unit such as a CPU which is not subject to the above difficulties.

It is another object of the present invention to provide a CPU which avoids the necessity of designing, manufacturing, and/or maintaining inventory of two or more versions of the same product.

It is another object of the present invention to provide an effective division between hardware and software of the complexity required to adapt a single product to different data ordering schemes.

It is another object of the present invention to provide a CPU which is adaptable to one of two or more predefined external schemes for ordering informational units, such as bytes, which are smaller than the data bus width.

The above objects and others are accomplished according to the present invention by designing the functional unit to follow any desired data ordering scheme internally, and to have both incoming and outgoing data pass through a data order conversion unit for adapting it to a selectable external data ordering scheme. The data order conversion unit should be capable of realigning informational units of a smaller size within informational units of a larger size, where the smaller size is the size below which all data may be considered in parallel, usually a byte, and the larger size is equal to the width of the largest informational unit to which the software may make external reference, usually equal to the data bus width. Realignment of informational units smaller than the smaller size is unnecessary because there is no ambiguity if bits are considered in parallel. Realignment of data across the boundaries of informational units of the larger size, a type of work which is performed frequently by software anyway, may be left to the software.

The means for specifying the external ordering scheme should be accessible from outside the physical package in which the functional unit is housed, so that only one of such packages need be designed, manufactured and maintained in inventory. If the functional unit is implemented (perhaps with other units) as a single chip, one or more pins may be dedicated to or usable for this purpose. If the functional unit is implemented as a module, the means for specifying the data ordering scheme may comprise a DIP switch located on the module, perhaps under a cover which is sealed by the manufacturer after being set.

In one embodiment of the invention the functional unit is a CPU chip or chip set in which data is transmitted to and from memory in the form of 32-bit words, but in which the software may address individual 8-bit bytes. The data order conversion unit realigns bytes within incoming or outgoing word in accordance with the specified external byte and halfword ordering scheme. Realignment of multiword strings of data is left to the software.

The data order conversion unit may comprise a load aligner and a store aligner, one or both of which comprises means for shifting (as distinguished from randomly realigning) informational units of the smaller size within an informational unit of the larger size by an amount dependent on the low order address bits generated within the CPU, wherein the shift amount is altered depending on the data order selection means. One or both of the means for shifting may also double as a general purpose shifter in the CPU.

BRIEF DESCRIPTION OF THE DRAWINGS

The invention will be described with respect to particular embodiments thereof. Reference will be made to the drawings, in which like members are given like designations, and in which.

DETAILED DESCRIPTION

Figure 1:
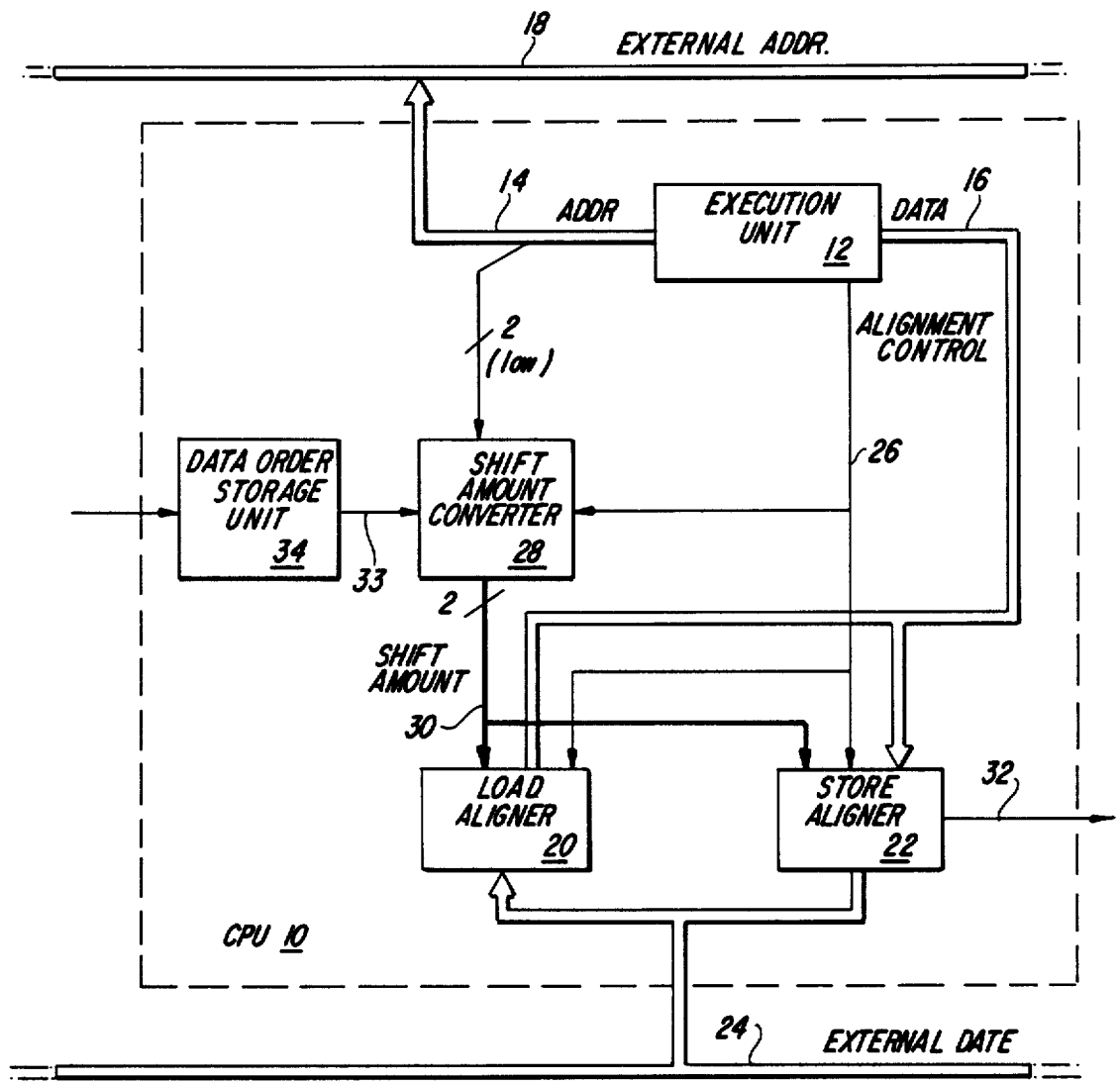
FIGS. 1 and 2 are block diagrams of embodiments of the present invention.

In FIG. 1 there is shown a block diagram of a CPU 10 constructed in accordance with the invention. It comprises an execution unit 12 which performs, among other things, instruction decode and data manipulation designated by software. The execution unit 12 has full 32-bit data paths and, wherever a choice must be made, is little endian in configuration. The execution unit 12 is connected to a 32-bit internal address bus 14 and a 32-bit internal data bus 16. The internal address bus 14 is connected to a 32-bit external address bus 18, which is connected in turn to main memory and various other external devices (not shown). The internal data bus 16 is connected to a load aligner 20 and a store aligner 22, which are in turn connected to a 32-bit external data bus 24. The load aligner realigns the position of the four bytes of incoming 32-bit data words before transmitting them to the execution unit 12 over the internal data bus 16. The load aligner takes into account such software-selectable factors as the reference type (byte, halfword or full word) and whether the incoming data is to be zero- or sign-extended. These characteristics are sent to the load aligner 20 by the execution unit 12 over alignment control leads 26. The load aligner 20 is also connected to the low order two bits of the internal address bus 14 so that the particular byte or bytes desired by the software may be selected and shifted to their rightmost positions in the incoming word. The two low order address bits are connected to the load aligner via a shift amount converter 28 (the function of which will be described below) and two shift amount leads 30.

The store aligner 22 is also connected to the alignment control leads 26 and the shift amount leads 30. It functions similarly to the load aligner 20, except that its operations are reversed. Since it realigns bytes on the internal data bus 16 before sending them out over the external data bus 24, its operations mirror those of the load aligner 20. Thus, for example, on a halfword load from the left half of a 32-bit memory location, the load aligner 20 would shift the incoming data to the right by 16 bits; whereas on a halfword store to the left half of the same memory location, the same shift would have to be made to the left. Additionally, the store aligner 22 generates write control signals which are transmitted to the main memory over write control leads 32 to designate which if any of the bytes on the external data bus 24 are to be written.

The purpose of the shift amount converter 28 is to adapt the CPU to whatever byte ordering scheme is used in the external hardware. If the external scheme is little endian, then no adaptation is necessary and the two low order address bits are transmitted to the shift amount leads 30 unaltered. Thus, on a load, the high order bits of the external address bus 18 are used to select the word from main memory in which the desired byte or bytes are located. That entire word is transmitted to the load aligner 20, which shifts the information to the right depending on the reference type and the shift amount leads 30. If the reference type is "byte", then the number of bytes by which the information is shifted is given directly by the two shift amount leads 30 (i.e., the low order two address bits). If the reference type is "halfword", then the number of bytes by which the information is shifted is given by twice the high order shift amount lead (i.e., 0 if the $2^1$ address bit is 0, 2 if the $2^1$ address bit is 1). If the reference type is "word", then no shifting takes place. Similar shifting takes place on a store through the store aligner 22, except that all shifting is to the left.

On the other hand, if the external hardware is big endian, then byte alignment is different. Bytes and halfwords are numbered from left to right instead of right to left, and the high order byte or halfword in a word is to the right of the remaining bytes or halfwords. One way to accommodate this difference would be to specify the byte order of the external hardware as an input to combinational logic in the load aligner 20 for selecting one byte of the external word to be put in each byte position of the internal word. However, since an entire 32-bit word is transmitted along the external data bus 24 regardless of the reference type, it is preferred that the difference be accommodated in the shift amount converter 28 merely by altering the two low order address bits before they enter the load and store aligners 20 and 22. Thus, if the reference type is "byte", both low order address bits are inverted before being passed to the shift amount leads 30. If the reference type is "halfword", then only the $2^1$ address bit is inverted. If the reference type is "word", then neither low order address bit is inverted. This logic effectively realigns bytes as necessary to adapt an internal little endian architecture to an external big endian architecture.

In order for the shift amount converter 28 to perform its function, it is connected to the alignment control leads 26 and, via a data order select input 33, to a data order storage unit 34. The data order storage unit 34 may comprise a D flip flop the D input of which is hardwired externally to a selected voltage level to indicate the data ordering scheme of the external architecture, and the clock input of which is connected to the power-up and system reset lines (not shown). Alternatively, the data order storage unit 34 may be omitted and the data order select input to the shift amount converter 28 connected directly to an external package pin which may be hardwired to the selected voltage level. It should be noted that no significant advantage would be gained by having the data ordering scheme selectable by the software, because the ordering scheme of the external hardware is by definition fixed. It will not change from power-up to power-down. Having the ordering scheme software selectable could also add significant complexity, since the software must accommodate such flexibility. There may, however, be circumstances in which software selectability is desired, and the benefits of providing it would have to be weighed against the detriments of increased software complexity.

In the above description, nothing has been said about the physical implementation of the embodiment. It should be apparent to a person of ordinary skill that for the most part, the physical implementation is not relevant to the invention. All the circuitry shown as constituting part of the CPU 10 in FIG. 1 can be implemented on one chip, or it can be divided into several. Additional circuitry not shown in FIG. 1 may also be integrated onto one or more of such chips. In order to obtain the benefits of the invention as described above, however, the means to select the external data ordering scheme should be accessible from outside the bounds of the physical unit of which it is desired to avoid manufacturing more than one version. Thus, if a CPU such as that designated 10 in FIG. 1 is to be manufactured as a single chip, perhaps with a memory management unit and cache control logic integrated thereon, then the data order storage unit 34 should be accessible from outside the chip, for example via a dedicated pin. If the CPU is to be implemented on a printed circuit board module, and the module is the physical unit which is to be usable in both big and little endian machines, then the data order storage unit 34 should be accessible from outside the module, for example by manual switching of a DIP switch either on or off the printed circuit board.

The advantages of an architecture such as that of the above embodiment are apparent. First, only the one version of the CPU need be designed, manufactured and stocked, since it is usable in both big and little endian computers. Contrary to previous techniques in which the data ordering scheme of the device had to be specified in the design process, the ordering scheme of this CPU need not be specified until it is installed in a larger package whose data ordering scheme is fixed. Second, no software complexity is dedicated to the realignment of bytes within words for conversion to a different external ordering scheme, and no time is wasted performing such conversions. All such conversions are performed in combinational logic which may be integrated on one chip with the execution unit and thereby made extremely fast. Multiword data storage and retrieval is not accommodated in this embodiment, and to the extent multiword accesses are dependent upon the data ordering scheme, the software must be able to re-order the words as necessary. The data order select input 33 may be made readable by the software for that purpose. However, the inability to automatically realign data on multiword accesses is not a significant drawback. Since the software usually moves around full words anyway, it does not add significant overhead to incorporate a selectable word-ordering scheme into program designs.

It should be noted that the architecture of a functional unit implementing the present invention does not necessarily prevent specialized software from directly accessing selected bytes in memory without regard to byte ordering schemes. This can be accomplished in the above embodiment by providing an alignment control lead which "turns off" the shift amount converter 28, causing it to pass the two low order address bits directly to the shift amount leads 30, regardless of the signal on the data order select input 33. Such an alignment control lead may be activated on certain addressing modes, and may be accompanied by additional signals to the load and store aligners 20 and 22.

Figure 2:
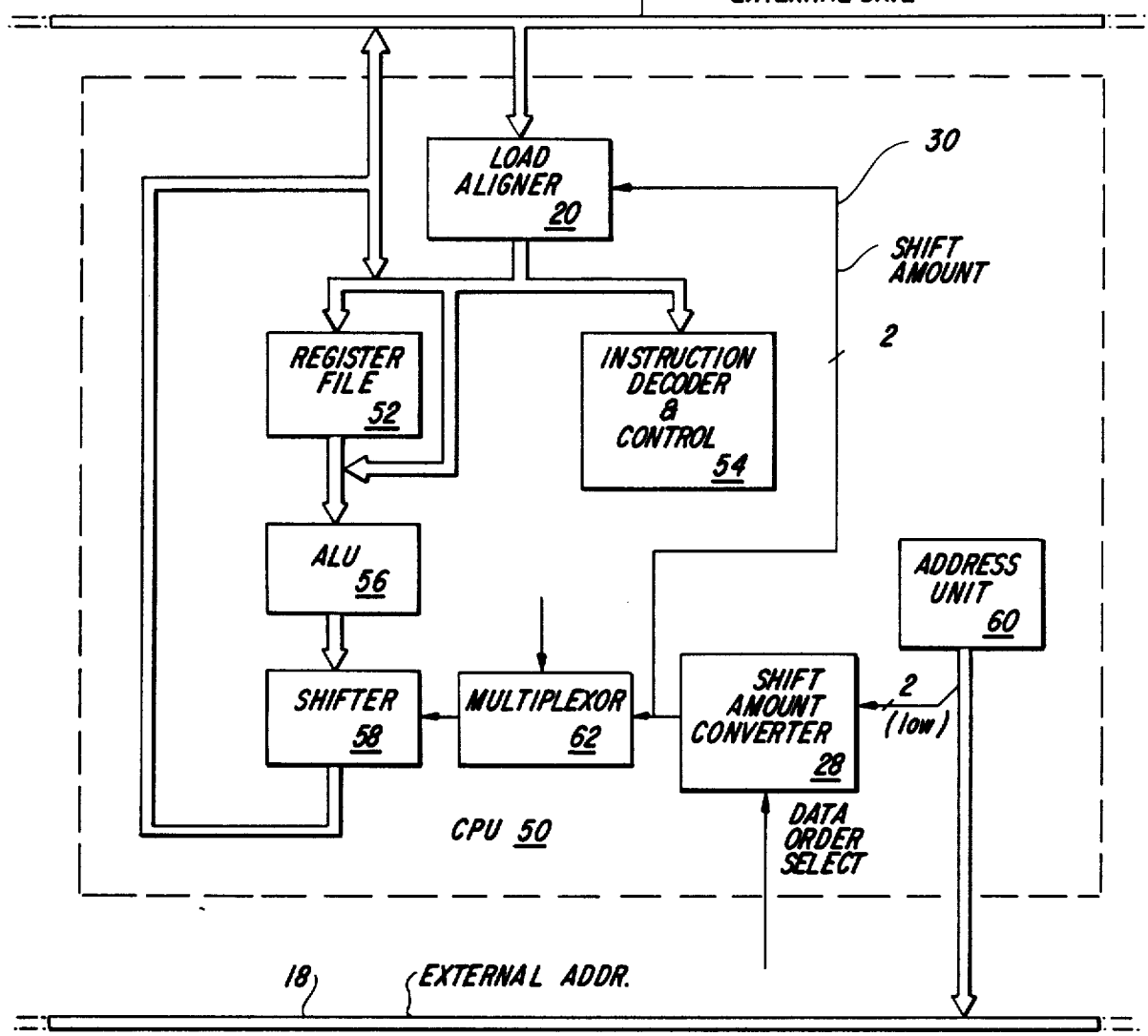

In FIG. 2 there is shown another embodiment of the present invention, in which a general purpose shifter doubles as the store aligner. The embodiment comprises a CPU 50, containing a load aligner 20 similar to that shown in FIG. 1. The load aligner 20 in the CPU 50 is connected on its input to the 32-bit external data bus 24, and on its output to a register file 52 and to an instruction decoder and control unit 54. The output of the load aligner 20 is also connected to an arithmetic logic unit (ALU) 56, as is the output of the register file 52. The ALU 56 is in turn connected to a general purpose shifter 58, which is capable of shifting data right or left by any number of bits from zero to 31. It is sufficient for the purposes of the invention, however, if the general purpose shifter 58 is capable of shifting data only by multiples of 8 bits. The output of the shifter 58 may be fed back to the register file 52 or enabled onto the external data bus 24. The CPU 50 also includes an address unit 60 which generates addresses and puts them out onto the 32-bit external address bus 18. As with the embodiment of FIG. 1, the two low order address bits in the embodiment of FIG. 2 are also transmitted to the shift amount converter 28, and the shift amount leads 30 on the output of the shift amount converter 28 are connected to the load aligner 20. The shift amount converter 28 and the load aligner 20 in FIG. 2 are identical to their counterparts in FIG. 1. Instead of also being connected to a separate store aligner as in FIG. 1, however, the shift amount leads 30 in FIG. 2 are connected to the general purpose shifter 58 through a multiplexer 62. The multiplexer 62 selects either the information on the shift amount leads 30 or shift amount information from another source (not shown) for presentation to the shifter 58.

The operation of the CPU 50 on a load is identical to the operation of the CPU 10 in FIG. 1 on a load and will not be repeated here. On an internal register to register operation, data from the register file 52 and/or the load aligner 20 passes through the ALU 56 and is transmitted to the shifter 58. The multiplexer 62 selects a shift amount and direction from sources in the CPU 50 not shown, and transmits that as control information to the shifter 58. The shifter 58 performs the desired operation and the result is fed back into the register file 52. The operation of the CPU 50 on a store is the same as its operation register to register, except that the output of the shifter 58 is enabled onto the external data bus 24, and the multiplexer 62 selects shift amount and direction information from the shift amount leads 30 instead of from the sources not shown. This ensures that data bytes are aligned appropriately for the byte order of the external hardware before the data is placed out on the external data bus 24. The embodiment of FIG. 2 therefore provides all the advantages of that of FIG. 1, and additionally saves space by combining the function of a store aligner shifter with a general purpose shifter already present in the CPU.

The invention has been described with respect to particular embodiments thereof, and it will be understood that numerous variations on these embodiments are possible within the scope of the invention. For example, a CPU may be designed according to the invention which is capable of realigning data but not instructions. In the embodiment of FIG. 2, this may be accomplished by connecting the input of the instruction decoder and control unit 54 to the external data bus 24, instead of to the output of load aligner 20. As another example, it was mentioned previously that the invention is not limited to CPUs. Thus, the invention may be applied to other functional units which are specific to a chosen data ordering scheme. It may be applied to functional units which do not have an address generating means, but instead merely pass along addresses generated elsewhere. It may also be applied to functional units which do not provide addresses at all, such as certain coprocessors. These and other variations on the described embodiments are all within the scope of the invention.

What is claimed is:

1. A data processing unit, which comprises:
    an execution unit for processing data;
    an internal data bus coupled to said execution unit for input of internal bus data to said execution unit, the internal bus data being organized into information units, each comprising a series of individual data groups, the individual data groups of each respective information unit being arranged within the respective information unit and relative to one another, in a preselected internal data ordering sequence for processing by said execution unit;
    means for aligning data groups within a respective information unit coupled to said internal data bus;
    an external data bus coupled to said means for aligning data groups, for input of external bus data to said means for aligning data groups, said external bus data being organized into the information units, each comprising a series of the individual data groups, the individual data groups of each information unit of the external bus data being arranged within the respective information unit and relative to one another, in an external data ordering sequence;
    a shift amount converter unit coupled to said means for aligning data groups within a respective information unit;
    means for storing information indicative of the preselected internal data ordering sequence and the external data ordering sequence and for generating a control signal indicative of a relationship between the preselected internal data ordering sequence and the external data ordering sequence;
    said means for generating a control signal being coupled to said shift amount converter unit for input of said control signal to said shift amount converter;
    said shift amount converter being responsive to said control signal to control said means for aligning to realign the data groups of each information unit of the external bus data, input to said means for aligning data groups, from the external data ordering sequence into the preselected internal data ordering sequence to provide the internal bus data for input to said execution unit; and
    means to selectively input information indicative of the external data ordering sequence to said means for storing information.

2. The data processing unit of claim 1 wherein said means to selectively input information indicative of the external data ordering sequence includes a data order select input line for selective input of the information indicative of the external data ordering sequence from a source external to said data processing unit.

3. The data processing unit of claim 2 further comprising a D flip flop coupled to said data order select line for storing the information indicative of the external data ordering sequence input on said data order select line, said D flip flop being coupled to said shift amount converter.

4. The data processing unit of claim 3 further comprising:
    an address bus coupled to said execution unit and said shift amount converter;
    said execution unit operating to generate an address for each information unit of the external data on said external data bus, for output to said address bus;
    each address including a first segment uniquely identifying a respective information unit of the external bus data and a second segment uniquely identifying a data group within the respective information unit;
    said shift amount converter receiving the second segment of each address on said address bus and operating to invert a preselected portion of the second segment of each address when the control signal input by said means for generating a control signal is indicative of the preselected internal data ordering sequence corresponding to a first data ordering sequence and the external data ordering sequence corresponding to a second data ordering sequence, the inverted second address segment being used to control said means for aligning data groups within a respective information unit.

* * * * *